Nov. 22, 1966

R. E. GANG 3,287,630

APPARATUS FOR IMPROVING THE UNIFORMITY OF MAGNETIC FIELDS

Filed March 2, 1964

INVENTOR.
ROBERT E. GANG
BY
Wm J. Nolen
ATTORNEY

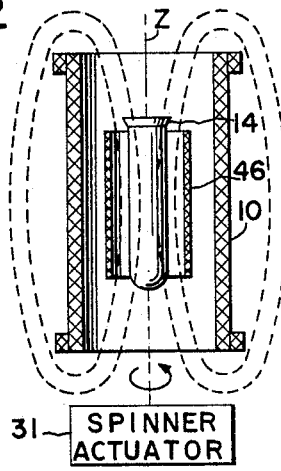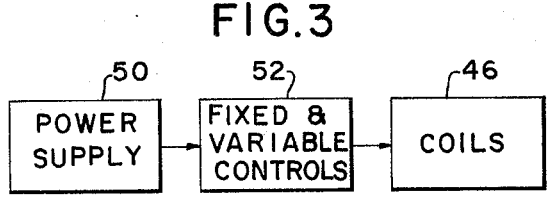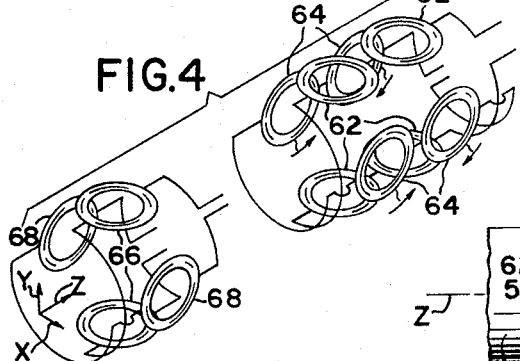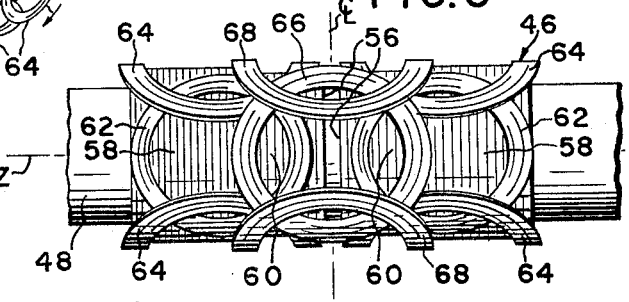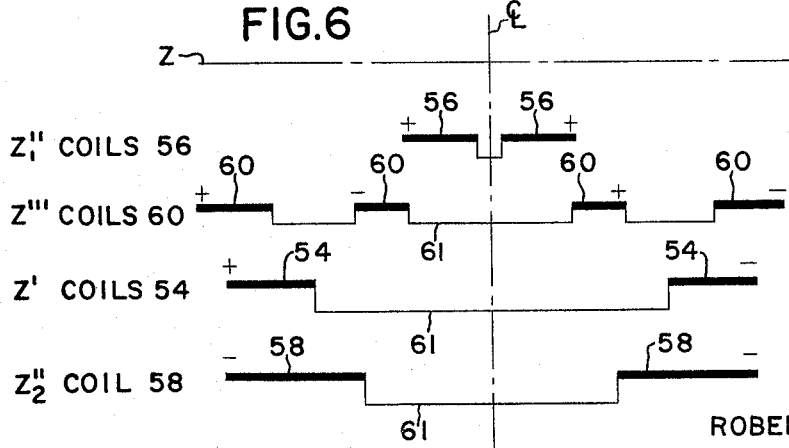

3,287,630
APPARATUS FOR IMPROVING THE UNIFORMITY OF MAGNETIC FIELDS
Robert E. Gang, Sunnyvale, Calif., assignor to Varian Associates, Palo Alto, Calif., a corporation of California
Filed Mar. 2, 1964, Ser. No. 348,442
9 Claims. (Cl. 324—.5)

This invention relates to a means for controlling magnetic fields, and in particular to an improved means for providing corrections to attain a highly precise uniform magnetic field.

Highly uniform magnetic fields are generally required for high resolution apparatus, such as used in nuclear magnetic resonance spectrometers for example. However, magnetic fields are subject to nonuniformity and inhomogeneity, and therefore, it is necessary to provide correction means, such as shims and coils, to compensate for field irregularities. Various solutions to this problem have been presented in U.S. Patent 2,858,504, and patent applications Serial No. 797,775 filed March 6, 1959 and 76,679 filed December 19, 1960, now Patent No. 3,199,021, issued August 3, 1965, all assigned to the same assignee. Further description may be found in an article entitled, "Electrical Current Shims for Correcting Magnetic Felds," by W. A. Anderson, in the Review of Scientific Instruments, March 1961, pages 241–250.

In some presently known high resolution spectrometers which process high frequency signals, such as 200 mc./sec., it is preferable to use cylindrical type superconducting magnets or solenoids to achieve magnetic field of great magnitude, greater than 50 kilogauss, by way of example. In these spectrometers, a sample is disposed in a cylindrical tube or container which is positioned within a probe. Upon application of a radio frequency field, gyromagnetic resonance of the nuclei of the sample is realized. The cylindrical type structure is convenient and desirable for use with presently known spectrometer apparatus, but problems arise when it is desired to correct for nonuniformity of the magnetic field configuration developed by such structures. Furthermore, the area surrounding the sample is limited in space, and thus conventional type shims and coils cannot be used successfully in the probe gap.

An object of this invention is to provide an improved means for obtaining a highly uniform magnetic field.

Another object of this invention is to provide compensation for irregularities and distortions in a magnetic field.

Although the following description is directed to the use of the invention in spectrometer apparatus, the scope of the invention is applicable to any apparatus that requires a highly uniform magnetic field.

According to this invention, a multiplicity of separately controlled orthogonal and independent coils provide adjustment for the nonuniformity of a magnetic field, which has a major component along a predetermined axis. Separate coils that are positioned at selected spacings are coaxially aligned with this major axis, and provide at least first, second and third order corrections. Additional sets of coils that are disposed along an arcuate surface which is radially spaced from the axis provide first and second order compensation in directions orthogonal to the major axis.

The invention will be described in greater detail with reference to the drawing in which:

FIG. 2 is a cross-sectional view of a part of the spectrometer apparatus;

FIG. 3 is a block diagram representing the circuitry associated with the coils used to carry out the objects of this invention;

FIG. 4 is an exploded perspective view of the inventive coil assembly;

FIG. 5 is a plan view of the coil assembly, in accordance with this invention; and FIG. 6 is an illustrative diagram to aid in the explanation of the spacing and location of the coils used in this invention.

Similar numerals refer to similar elements throughout the drawing.

Figure 1:
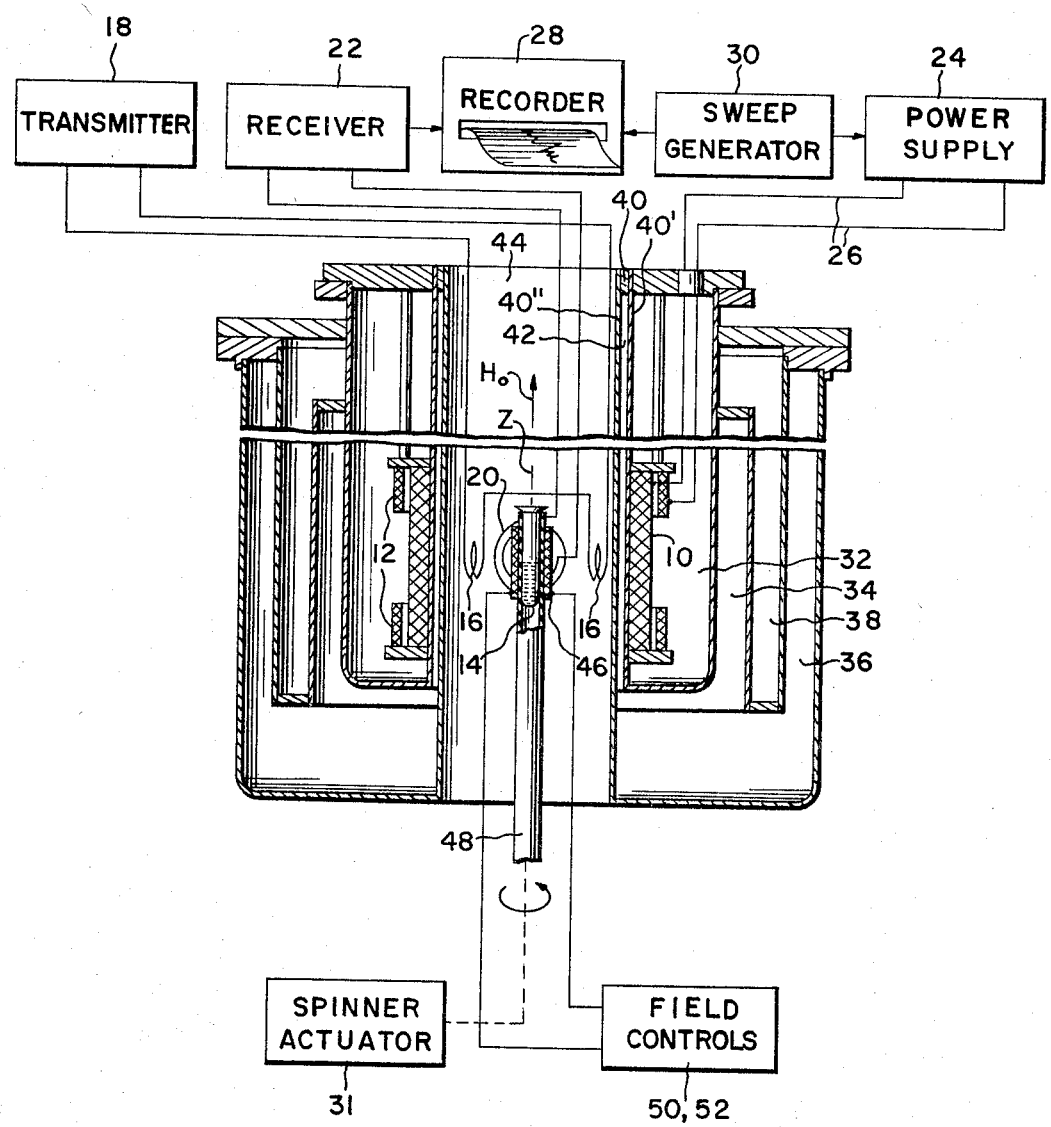
FIG. 1 is a schematic view, partly in block, of a spectrometer in accordance with this invention.

In FIG. 1, a gyromagnetic resonance spectrometer comprises an annular superconducting solenoid 10 which provides a magnetic field $H_0$ having a major component along a predetermined Z axis. The solenoid 10 may have end correcting means or shims 12 that serve to rectify the curved portions of the flux lines of the magnetic field $H_0$, thereby affording a more linear field configuration. Within the annulus of the solenoid 10 a cylindrical container or tube 14, containing a sample to be analyzed, is positioned so that the cylindrical axis of the tube is substantially in alignment with the Z axis. A pair of transmitter coils 16 are disposed straddling the sample with their axes as shown herein at approximately right angles to the direction of the magnetic field $H_0$. The transmitter coils 16 are energized by R.F. wave energy derived from a transmitter 18. A detector or receiver coil 20 is disposed adjacent to the sample of matter with its axis oriented at approximately right angles to the axis of the transmitter coils 16 and the direction of the magnetic field $H_0$. The receiver coil 20 is connected to the input of an R.F. receiver 22. In some apparatus, the transmitter coils and receiver coil may be axially aligned with $H_0$.

The superconducting solenoid 10 is energized from a power supply 24 via leads 26 and generates a high intensity uniform D.C. magnetic field $H_0$ as of, for example, 55–65 kilogauss over a region of 0.5" x 0.5" x 2.0".

In operation the solenoid 10 is energized and R.F. energy derived from the transmitter 18 is applied to the sample, substantially at the Larmor frequency of the gyromagnetic bodies within the sample under analysis, thereby exciting gyromagnetic resonance of the gyromagnetic bodies. Resonance of the gyromagnetic bodies is detected by excitation of an R.F. signal in receiver coil 20 at the Larmor frequency. The resonance signal is applied to the input of the receiver 22 and is amplified and deteced therein to provide an output D.C. resonance signal which is fed to and recorded by a recorder 28. A gyromagnetic resonance signal spectrum of the sample under analysis is obtained by sweeping the D.C. magnetic field intensity $H_0$ through successive resonances of the groups of gyromagnetic bodies within the sample by means of a sweep generator 30 which provides a sweep signal to the power supply 24, which in turn sweeps the current flowing through the solenoid 10. Alternatively, the power supply 24 is used to bring $H_0$ up to the desired magnitude, and then the solenoid terminals are short circuited, and the magnet 10 operates in the persistent mode. The magnet 10 may then be swept with sweep coils associated with the sample. In addition, the sweep generator 30 supplies a signal to the recorder 28 causing the resonance signal to be recorded as a function of the sweep field. A spinner means 31 is provided to rotate the sample container 14 about its cylindrical axis, in a well known manner. The gyromagnetic resonance signal spectrum obtained from the recorder 28 is useful for chemical analysis of the sample under investigation.

The superconducting magnet system includes a hollow cylindrical chamber 32 surrounding the solenoid 10 and filled with a coolant at a very low temperature, which may be liquid helium at approximately 4° K. The chamber 32 is insulated from ambient temperature by means of a plurality of coaxial surrounding chambers, such chambers including chambers 34 and 36, which are evacuated to a very low pressure such as for example, $10^{-6}$ millimeters to minimize thermal condition therethrough. Interposed between the vacuum chambers 34 and 36 is a chamber 38 containing liquid nitrogen at approximately 77° K. The second vacuum chamber 36 serves to minimize thermal conduction between the outside air and the nitrogen chamber 38. The outer wall of the vacuum chamber 36 forms the outer wall of the magnet assembly and is exposed on its outer surface to atmospheric conditions.

A glass or metal dewar 40 is disposed centrally of the superconducting solenoid 10. The outer wall of the dewar 40 forms the inner wall of the liquid helium chamber 32. The dewar 40 includes two coaxially disposed and spaced apart glass or metal walls 40' and 40" with a vacuum chamber 42 disposed therebetween. The inner coaxial wall 40" defines an open ended chamber 44 exposed to ambient conditions, extending through the center of the superconducting solenoid 10. The chamber 44 is open at both ends, top and bottom, to permit easy access to the magnetic field. In a typical installation the superconducting solenoid 10 provides a D.C. magnetic field of up to 65 kilogauss centrally thereof. The solenoid 10 is constructed of a suitable superconducting material, as of copper jacketed NbZr wire, to provide a substantially uniform field over its central region. This region of uniform field is cylindrical and is approximately ½" in diameter and 2" long.

In accordance with this invention, a coil assembly 46 is utilized to provide compensating gradients and field corrections that correct for any nonuniformity of the magnetic field $H_0$. As depicted in FIGS. 2, 4 and 5, the coil assembly 46 is mounted on a nonmagnetic support 48, which may be made from an aluminum or heavy stock paper cylinder. The coil sets of the assembly 46 are coupled to a power supply 50, as illustrated in FIG. 3, through an electrical control system 52 which may include control resistors. Each set of coils is separately and independently controlled by its own variable resistance circuit or like means so that separate magnetic correcting fields may be generated by each coil set individually without affecting the corrections made by other coil sets. The detailed circuitry is not shown herein for the purpose of convenience, as such structure is within the purvue of those skilled in the art. A similar type structure is illustrated in the aforementioned patent application Serial No. 797,775, FIG. 1.

With further reference to FIGS. 4, 5 and 6, the coil assembly 46 includes four groups of coaxially aligned coils that supply first order corrections or linear gradients, as well as secondary and tertiary corrections relative to the Z axis. A first group of pair of coils 54, designated as the first order Z' coils, produces a corrective magnetic field having a major component along the Z-axis and are connected in opposition and are spaced about a centerline of the support 48 by a distance preferably less than the diameter of the cylinder 14, which may be about 86% of the diameter for example. Such a spacing eliminates third order gradients from the compensating field produced by the Z' coils 54. In FIG. 6, those coils marked as positive are considered conducting clockwise; whereas those coils marked as negative are deemed to be conducting counterclockwise, for purpose of explanation. Thus, connected coils designated by similar polarities have aiding current flow, and those connected coils designated by opposite polarities conduct current in opposition or bucking relation. The various coils are shown connected by lead lines 61.

To achieve second order corrections along the Z direction, a pair of coils 56, designated as the inner curvature $Z_1''$ coils, are disposed close to the centerline, and are connected in current aiding relation. The inner curvature coils 56 are spaced along the Z axis at less than Helmholtz spacing, which is defined as being equivalent to the radius a of the cylinder 14. An example of a spacing that was successfully used is about 25% of the diameter. This pair of $Z_1''$ coils 56 tends to change the intensity of the major component of the magnetic field $H_0$ supplied by the superconducting solenoid 10, and therefore, a complementary pair of coils 58, designated as the outer curvature $Z_2''$ coils, are utilized to minimize the zero order components developed by the inner curvature coils 56. These $Z_2''$ coils are spaced at a distance greater than Helmholtz spacing along the Z axis. The outer curvature coils 58, in effect, vary the magnitude of the magnetic field $H_0$ to counteract spurious changes in the intensity of $H_0$ caused by the $Z_1''$ coils 56.

In the event that third order correction is desired to achieve exceptionally high resolution, two pairs of bucking coils 60, designated as the $Z'''$ coils, are employed to enhance third order compensation. The $Z'''$ coils 60 are superimposed on the $Z_1''$ coils 56 and are preferably symmetrically disposed about the centerline of the coil assembly support 48. It has been found that in a spectrometer system wherein a 200 mc. signal is being processed, and a 47 kilogauss field is supplied by a superconducting magnet, an exceptionally high resolution spectral trace may be obtained without the need of third order compensating coils.

For example, in addition, a pair of Helmholtz coils, which are not illustrated herein for the purpose of convenience, may be disposed coaxially with the other coaxially aligned coils, these Helmholtz coils being spaced at a distance equivalent to the radius of the cylindrical container wherein the sample is placed.

The inventive coil assembly further provides compensation in the X and Y directions defining principal magnetic axes, which are orthogonal to the Z axis. To this end, three sets of arcuate coils are set around the surface of the cylinder in superposition on the Z compensating coils to provide first and second order compensation. A first set, designated herein as the X correction coils or loop portions, includes four coils 62 which are disposed substantially symmetrically around the Z axis and around the centerline of the support 48 and each loop defining a principal magnetic axis and producing a field component which is orthogonal to the Z-axis. The four X coils 62 appear in pairs on opposing sides of the cylindrical coil assembly, that is, spaced 180° apart. Each pair of X coils 62 is symmetrically disposed relative to the centerline of the support 48, and the current in one coil of the pair being clockwise, whereas the current in the other coil of the pair is counterclockwise. In this manner, the currents in the adjacent parallel portions of the pairs of coils 62 which appear on the same side provide a linear gradient in the X direction. Similarly, the pair of X coils in the opposite side provide a linear gradient, which is directed in substantially the same X direction as that of the first pair of X coils. In a similar manner, four Y coils 64, which are displaced 90° from the four X coils 62 provide a linear gradient displaced 90° relative to the X linear gradient.

To achieve second order correction in the X-Z plane and the Y-Z plane, a third set of two pairs of coils are utilized. One pair of X-Z coils 66 are spaced 180° apart and are connected in current aiding relation. The other pair of Y-Z coils 68 are also spaced 180° apart, but 90° from X-Z coils 66. All four coils are positioned to straddle the center portion of the cylindrical support 48. The X coils 62, Y coils 64, X-Z coils 66 and Y-Z coils 68 are mounted to conform to the surface of the cylindrical support 48, and are preferably arranged in a symmetrical configuration. It is understood that variations in pattern or geometry may be employed within the scope of this invention.

In operation, with the sample tube 14 and coil assembly 46 located within the probe, the nuclear resonance signal may be observed and adjustments made by varying field controls 52 to obtain the sharpest resonance line. Alternatively, the field along the X, Y and Z axes may be measured and plotted and undesirable gradients eliminated by simple adjustments.

With the combination of coil sets provided herein, it is possible to obtain linear gradients and first order as well as higher order corrections for nonuniformity of magnetic fields. In a particular application of this invention, a 200 mc. spectrometer operating with a 47 kilogauss field generated by a superconducting solenoid, utilizing 7 mil copper wire energized by currents measured in milliamperes.

The scope of this invention is not limited to the particular configuration or parameters described herein. For example, it is possible to employ the combination of coil sets external to the superconducting solenoid, and the coils themselves may be made from superconducting material. In such event, the currents supplied to the coils would be measured in amperes or fractions thereof. Also, the number of coils and coil sets may be varied, and the shapes of the arcuate coils on the support surface may be elliptical, square, rectangular, as well as circular.

It should be noted that the instant application discloses means for correcting the gradients of the major component of the magnetic field $H_0$, that is $H_z$ or the component in the Z direction. Thus, the inventive coil assembly serves to correct those gradients designated as:

$$\frac{\partial H_z}{\partial X}, \frac{\partial H_z}{\partial Y}, \frac{\partial H_z}{\partial H_z}, \frac{\partial^2 H_z}{\partial Z^2}, \frac{\partial^3 H_z}{\partial Z^3}, \frac{\partial^2 H_z}{\partial X \partial Z}, \frac{\partial^2 H_z}{\partial Y \partial Z}$$

as set forth in the aforementioned U.S. patent application Serial No. 76,679.

What is claimed is:

1. In a spectrometer, the combination of: a sample secured in a container having a major axis; a superconducting solenoid for providing a magnetic field having a major component substantially in alignment with the major axis of said container; a first pair of spaced coils for providing first order gradient corrections, coaxially aligned with such container, and connected in current opposition; a second pair of spaced coils for providing second order gradient corrections, coaxially aligned with said container and additively current connected; a third pair of coils coaxially aligned with said container and additively current connected for minimizing the zero order component developed by said second pair of coils; first and second sets of coils for providing first order gradient corrections, each set comprising four correcting coils substantially symmetrically disposed about the center of said sample, two of such coils being 180° apart located over such center, the other two coils being 180° apart located below such center, the first and second sets being disposed 90° apart around such cylinder; means for supplying electrical power to said coil pairs and sets; and means for separately controlling the electrical power supplied to each of said coil pairs and coil sets.

2. In a spectrometer, the combination of: a sample to be analyzed contained in a substantially cylindrical container; means for spinning said sample; a superconducting solenoid for providing a magnetic field having a major component substantially in alignment with the cylindrical axis of said container; a first pair of spaced coils for providing first order gradient corrections, coaxially aligned with said container, being spaced axially at less than the diameter of said container, and connected in current opposition; a second pair of spaced coils for providing second order gradient corrections, coaxially aligned with said container, being spaced axially at less than the radius of said container, and connected for current aiding; third and fourth pairs of coils for providing third order corrections and canceling first order corrections, coaxially aligned with said container, and connected in bucking relationship a fifth pair of spaced coils, coaxially aligned with said container, being spaced at greater than the radius of the container, and additively current connected, for minimizing the zero order component developed by said second pair of coils; first and second sets of coils for providing first order gradient corrections, each set comprising four correcting coils substantially symmetrically disposed about a center planar portion of said container, two of such coils being 180° apart located on one side of said center portion, the other two coils being 180° apart relative to each other and located on the other side of said center portion, the first and second sets being disposed 90° apart around such cylinder; a third set of coils for providing second order corrections comprising four coils disposed 90° apart around the cylindrical container and straddling the center portion of said container; means for supplying electrical power to said coil pairs and sets; and means for separately controlling the electrical power supplied to each of said coil pairs and sets.

3. In a spectrometer, the combination of: a sample contained in a substantially cylindrical container; means for providing a magnetic field having a major component substantially in alignment with the cylindrical axis of said container; a first set of coils for providing order gradient corrections coaxially aligned with such container and connected in current opposition; a second set of coils for providing second order gradient corrections, coaxially aligned with said container, and connected in aiding current relation; a third set of coils, coaxially aligned with said container, and connected in current aiding relation for minimizing the zero order component developed by said second set of coils; fourth and fifth sets of coils for providing first order gradient corrections, each of the fourth and fifth sets comprising four correcting coils substantially symmetrically disposed about the center of said sample, two of such coils being 180° apart located over such center, the other two coils being 180° apart located below such center, the fourth and fifth sets being disposed 90° apart around such cylinder; a sixth set of coils for providing second order corrections comprising four coils disposed 90° apart around the cylindrical container and straddling the center of said container; means for supplying electrical power to said coil sets; and means for separately controlling the electrical power supplied to each coil set.

4. A high resolution spectrometer comprising: a sample to be analyzed; a container for securing said sample; superconducting solenoid means for supplying a magnetic field having its major axis substantially coincident with the major axis of the container; transmitter means for supplying a radio frequency signal to said sample to induce gyromagnetic resonance; receiver means for detecting such resonance signal; a coil assembly comprising a multiplicity of coil sets mounted around said container, including a coil set coaxially aligned with said major axis; and a coil set having 4 separate current loop portions formed on and curving with the surface of a cylinder with the axes of the current loop portions disposed substantially orthogonally to the major axis; and adjustable means for providing current separately to each of said coil sets for independently correcting for nonuniformity of the magnetic field without substantial mutual interference between the optimal adjustments of the currents of the coil sets.

5. A high resolution spectrometer comprising: a sample to be analyzed; a cylindrical container for securing said sample; superconducting solenoid means for supplying a magnetic field having its major axis substantially coincident with the cylindrical axis of the container; transmitter means for supplying a radio frequency signal to said sample to induce gyromagnetic resonance; receiver means for detecting such resonance signal; generator means for sweeping such resonance signal; means for spinning said sample about said major axis of the magnetic field; a coil assembly comprising a multiplicity of field uniformity correcting coil sets mounted concentrically around said cylindrical container, including coaxially aligned coil sets and arcuate coil sets, said arcuate coil sets each formed by 4 separate current loop portions formed on and curving with the surface of a cylinder and having the axes of the loop portions disposed substantially orthogonally relative to the coaxially aligned coils; and means for providing current separately to each of said coil sets and for varying such currents to correct for nonuniformity of the magnetic field without substantial mutual interference between the optimal adjustments of the currents of the coil sets.

6. Spectrometer apparatus comprising: a cylindrical superconducting solenoid for providing a magnetic field having a major axis coincident with the axis of such solenoid; a field compensating coil assembly disposed within said solenoid, said assembly being mounted on a cylindrical nonmagnetic support, said support adapted to accommodate a container of a sample to be analyzed, said coil assembly having coaxially aligned coil sets mounted to said support for providing first order and higher order gradient corrections to the magnetic field along the major axis; and coil sets substantially orthogonally disposed and conforming in shape substantially to the surface contours of said cylindrical support for providing gradient corrections to the magnetic field in directions orthogonal to the major axis and independently of each other, each coil set being separately and independently adjustable.

7. A combination for correcting the non-uniformity of a magnetic filed having a major component along a given axis comprising: a first magnetic field coil means having a principal magnetic axis coaxially aligned with the given axis for providing a first order gradient correction; second magnetic field coil means having a principal magnetic axis coaxially aligned with the given axis for providing a second order gradient correction, means for providing optimized field correction current settings in said first and second coil means; and a coil set having 4 current loop portions formed on and curving with the surface of a cylinder, said cylindrical surface being coaxially disposed of said given axis and said loop portions each having a principal magnetic axis and field component orthogonal to said given axis for providing a second first order gradient correction which is independently adjustable without interference with optimized settings of said other coil means.

8. The apparatus according to claim 7 including a second coil set having 4 current loop portions formed on and curving with the surface of a cylinder coaxially of said given axis, and said second coil set being disposed at 90° of angular displacement about the given axis from said first 4 loop coil set and said loop portions each having a principal magnetic axis and field component orthogonal to said given axis to provide a third first order gradient correction which is independently adjustable without interfereing with previously optimized settngs of said other coil means.

9. The apparatus according to claim 7 wherein said coil set is disposed such that the centers of the 4 current loop portions lie in a plane containing the given axis.

References Cited by the Examiner

UNITED STATES PATENTS

| | | | |
|---|---|---|---|
| 2,830,212 | 4/1958 | Hanlet | 317—200 |
| 2,858,504 | 10/1958 | Nelson | 324—0.5 |
| 3,081,428 | 3/1963 | Fowler | 324—0.5 |

FOREIGN PATENTS 884,129  12/1961  Great Britian.

OTHER REFERENCES

Anderson: The Review of Scientific Instruments, vol. 32, No. 3, March 1961, pp. 241–250 incl.

Harris: Journal of Research of the National Bureau of Standards, Research No. PP716, vol. 13, September 1934, pp. 391 to 396 and 400 principally relied on.

Marshall et al.: Journal of Applied Physics, vol. 34, No. 11. November 1963, pp. 3175 to 3178 incl.

McKeehan: Review of Scientific Instruments, vol. 7, March 1936, pp. 150–153 incl.

Mitchell et al.: Review of Scientific Instruments vol. 28, No. 8, August 1957 pp. 624–628 incl.

WALTER L. CARLSON, *Primary Examiner.*

MAYNARD R. WILBUR, CHESTER L. JUSTUS,
*Examiners.*

A. E. RICHMOND, *Assistant Examiner.*